United States Patent
Nilsson et al.

(10) Patent No.: US 9,654,198 B2
(45) Date of Patent: *May 16, 2017

(54) NODE IN A COMMUNICATION SYSTEM WITH SWITCHABLE ANTENNA FUNCTIONS

(71) Applicant: Telefonaktiebolaget L M Ericsson (publ), Stockholm (SE)

(72) Inventors: Andreas Nilsson, Göteborg (SE); Anders Derneryd, Göteborg (SE); Jonas Fridén, Mölndal (SE); Lars Manholm, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/683,463

(22) Filed: Apr. 10, 2015

(65) Prior Publication Data
US 2015/0215024 A1    Jul. 30, 2015

Related U.S. Application Data

(63) Continuation of application No. 13/702,542, filed as application No. PCT/EP2010/058243 on Jun. 11, 2010, now Pat. No. 9,031,519.

(51) Int. Cl.
*H03C 7/02* (2006.01)
*H04B 1/02* (2006.01)
(Continued)

(52) U.S. Cl.
CPC ............ *H04B 7/0689* (2013.01); *H01Q 3/24* (2013.01); *H01Q 3/26* (2013.01); *H01Q 21/28* (2013.01);
(Continued)

(58) Field of Classification Search
CPC .. H04B 7/0689; H04B 7/0413; H04B 7/0617; H04B 7/0693; H04B 7/0408;
(Continued)

(56) References Cited

U.S. PATENT DOCUMENTS 4,823,398 A    4/1989   Hashimoto
5,283,587 A    2/1994   Hirshfield et al.
(Continued)

FOREIGN PATENT DOCUMENTS

CN    1095194 A    11/1994
CN    1298610 A    6/2001
(Continued)

OTHER PUBLICATIONS

Heath, RW., Jr., Airy, M., and Paulraj, A.J., "Multiuser Diversity for MIMO Wireless Systems with Linear Receivers," Signals, Systems and Computers, 2001. Conference Record of the Thirty-Fifth Asilomar Conference on, vol. 2, Nov. 4-7, 2001, pp. 1194-1199.
(Continued)

*Primary Examiner* — Jean B Corrielus
(74) *Attorney, Agent, or Firm* — Coats & Bennett, PLLC

(57) ABSTRACT

Systems and methods of a node in a wireless communication system with switchable antenna functions are provided. In one exemplary embodiment, a method by a controller for configuring a switching network may include configuring the switching network for a first mode of operation associated with multiple-input, multiple-output (MIMO) communications. Further, the method may include configuring the switching network for a second mode of operation associated with beamforming communications.

23 Claims, 4 Drawing Sheets

(51) Int. Cl.
*H04B 7/06* (2006.01)
*H01Q 3/24* (2006.01)
*H01Q 3/26* (2006.01)
*H01Q 21/28* (2006.01)
*H01Q 21/29* (2006.01)
*H04B 7/0408* (2017.01)
*H04B 7/0413* (2017.01)
*H04L 5/00* (2006.01)

(52) U.S. Cl.
CPC .......... *H01Q 21/29* (2013.01); *H04B 7/0408* (2013.01); *H04B 7/0413* (2013.01); *H04B 7/0617* (2013.01); *H04B 7/0693* (2013.01); *H04L 5/0048* (2013.01)

(58) Field of Classification Search
CPC ........ H04B 7/043; H04L 5/0048; H01Q 3/26; H01Q 21/28; H01Q 21/29; H01Q 3/24
See application file for complete search history.

(56) References Cited

U.S. PATENT DOCUMENTS

| | | | |
|---|---|---|---|
| 6,421,005 B1 | 7/2002 | Weaver et al. | |
| 6,748,216 B1 | 6/2004 | Lee | |
| 6,801,514 B2 | 10/2004 | Ma | |
| 7,039,441 B1 | 5/2006 | Reudink et al. | |
| 7,254,184 B2 | 8/2007 | Buljore et al. | |
| 7,403,748 B1* | 7/2008 | Keskitalo | H04B 7/06 455/101 |
| 7,574,236 B1* | 8/2009 | Mansour | H04B 7/0413 455/562.1 |
| 8,121,537 B2 | 2/2012 | Hwang et al. | |
| 8,301,078 B2* | 10/2012 | Kim | H04B 7/15592 370/211 |
| 8,615,270 B2 | 12/2013 | Ibrahim et al. | |
| 9,226,171 B2* | 12/2015 | Safavi | H04W 24/02 |
| 2002/0132600 A1* | 9/2002 | Rudrapatna | H01Q 1/246 455/277.1 |
| 2002/0173302 A1 | 11/2002 | Baker et al. | |
| 2003/0092379 A1 | 5/2003 | Brothers, Jr. et al. | |
| 2004/0063468 A1 | 4/2004 | Frank | |
| 2006/0234777 A1 | 10/2006 | Vannithamby et al. | |
| 2007/0176836 A1 | 8/2007 | Abramov et al. | |
| 2007/0183523 A1* | 8/2007 | Koo | H04B 7/0413 375/261 |
| 2007/0194991 A1 | 8/2007 | Mohamadi | |
| 2008/0181180 A1* | 7/2008 | Karaoguz | H04B 7/0408 370/331 |
| 2008/0238797 A1* | 10/2008 | Rowell | H01Q 11/10 343/776 |
| 2008/0238807 A1* | 10/2008 | Ibrahim | H01Q 21/29 343/876 |
| 2008/0285524 A1* | 11/2008 | Yokoyama | H04B 7/0632 370/336 |
| 2009/0016461 A1* | 1/2009 | Jitsukawa | H04B 7/04 375/267 |
| 2009/0163167 A1* | 6/2009 | Hillery | H04W 52/12 455/296 |
| 2010/0309781 A1* | 12/2010 | Wang | H04B 7/0871 370/229 |
| 2011/0013712 A1* | 1/2011 | Martin | H04L 25/0248 375/267 |
| 2011/0235755 A1* | 9/2011 | Yang | H04B 7/0426 375/340 |
| 2011/0268049 A1* | 11/2011 | Luo | H04B 7/0413 370/329 |
| 2013/0082897 A1* | 4/2013 | Liu | H01Q 1/36 343/893 |
| 2014/0269368 A1* | 9/2014 | Xu | H04W 24/00 370/252 |
| 2014/0301504 A1* | 10/2014 | Chavali | H04B 7/0413 375/316 |

FOREIGN PATENT DOCUMENTS

| | | |
|---|---|---|
| EP | 1486796 A2 | 12/2004 |
| JP | 2002064427 A | 2/2002 |
| WO | 9921391 A2 | 4/1999 |
| WO | 9952311 A1 | 10/1999 |
| WO | 03094387 A1 | 11/2003 |
| WO | 2004093416 A1 | 10/2004 |
| WO | 2009083647 A1 | 7/2009 |

OTHER PUBLICATIONS

Airy, M., Shakkottai, S., and Heath, R.W., Jr., "Spatially greedy scheduling in multi-user MIMO wireless systems," Signals, Systems & Computers, 2002 The Thirty-Seventh Asilomar Conference on, vol. 1, Nov. 9-12, 2003, pp. 82-986.

Aktas, D. and Gamal, H.E., "Multiuser scheduling for MIMO wireless systems," Vehicular Technology Conference 2003, VTC 2003-Fall 2003 IEEE 58th, vol. 3, Oct. 6-9, 2003, pp. 1743-1747.

* cited by examiner

US 9,654,198 B2

NODE IN A COMMUNICATION SYSTEM WITH SWITCHABLE ANTENNA FUNCTIONS

CROSS-REFERENCE TO RELATED APPLICATIONS

This application is a continuation of U.S. patent application Ser. No. 13/702,542, filed Dec. 6, 2012, now U.S. Pat. No. 9,031,519, issued May 12, 2015, which is the National Stage of International App. No. PCT/EP2010/058243, filed Jun. 11, 2010, all of which are entitled "NODE IN A COMMUNICATION SYSTEM WITH SWITCHABLE ANTENNA FUNCTIONS," and all of which are hereby incorporated by reference as if fully set forth herein.

TECHNICAL FIELD

The present invention relates to a node in a wireless communication system, the node comprising at least a first antenna function, a second antenna function, a first radio chain and a second radio chain. At least at the start of a first mode of operation, each antenna function is connected to a corresponding radio chain.

The present invention also relates to a method in a wireless communication system, the method comprising the step: at the start of a first mode of operation, connecting antenna functions to corresponding radio chains, each antenna function being connected to a corresponding radio chain.

BACKGROUND

The use of mobile phones and wireless broadband devices has increased rapidly during the last decade, and it is expected to grow even faster during coming years. To meet these demands, operators must increase the capacity in their communication systems.

A well-known way of increasing the capacity in communication systems is to integrate more than one antenna and radio chain, both at the base stations and at the user terminals, and use so-called MIMO (Multiple Input Multiple Output).

Today, a user terminal such as a mobile phone is mostly used for voice communication, but a clear trend is that more and more people are using their mobile phones for data applications, e.g. streaming movies and music, chat, and the Internet in other ways. One problem with mobile phones is that their battery capacity is relatively limited, and it is therefore needed to re-charge the mobile phone battery frequently. In the future when more radio chains will be integrated in the terminals, the power consumption will increase and the battery must be recharged even more frequently. There is therefore a need for reducing the power consumption to increase the time between charging. In addition the carbon-dioxide "footprint" of the device will be smaller.

WO 2009/080110 describes a device that combines two antenna elements using a beam-forming network and thereby optimizing the antenna gain and polarization to the environment. However, the number of antennas and the number of active radios are fixed.

A mobile phone, or another wireless broadband device constituting a user terminal, in a MIMO system may experience a rank-one channel or have no need for high data rates. For example, in line-of-sight scenarios between a user terminal and a base station, the propagation channel often only supports one stream, unless both ends of the link have dual polarized antennas. In such cases, the user terminal cannot, or does not, need to utilize multiple streams.

A similar situation is present in other types of nodes such as base stations and repeater stations.

There is thus a need for a more efficient use of antennas and radio chains in a node.

SUMMARY

The object of the present invention is to obtain a more efficient use of antennas and radio chains in a node.

Said object is achieved by means of a node in a wireless communication system, the node comprising at least a first antenna function, a second antenna function, a first radio chain and a second radio chain. At least at the start of a first mode of operation, each antenna function is connected to a corresponding radio chain. The node further comprises a switching network and a beamforming network, which switching network, at least at the start of a second mode of operation, is arranged to disconnect at least one antenna function from its corresponding radio chain and connect said at least one disconnected antenna function to another of said corresponding radio chains via at least a part of the beamforming network, such that at least two antenna functions are connected to the same radio chain at least at the start of the second mode of operation. The node is arranged to perform beamforming for said at least two antenna functions by means of said beamforming network, the switching network being arranged to switch between the first mode and the second mode.

Said object is also achieved by means of a method in a wireless communication system, the method comprising the steps:

at the start of a first mode of operation, connecting antenna functions to corresponding radio chains, each antenna function being connected to a corresponding radio chain;

at the start of a second mode of operation, disconnecting at least one antenna function from its corresponding radio chain;

connecting said at least one disconnected antenna function to another of said corresponding radio chains via at least a part of a beamforming network, such that at least two antenna functions at the second mode of operation are connected to the same radio chain; and using said beamforming network to perform beamforming for said at least two antenna functions.

According to an example, the number of radio chains and antenna functions is equal, where, in the first mode of operation, only one antenna function is connected to each radio chain.

According to another example, the beamforming network comprises at least one phase shifter and/or at least one attenuator.

According to another example, the node further comprises a control unit which is arranged to control the switching network and the beamforming network.

According to another example, those radio chains from which an antenna function is disconnected, are turned off.

According to another example, the first mode of operation corresponds to MIMO, Multiple Input Multiple Output, communication.

Other examples are disclosed in the dependent claims.

The main advantage with the invention is that the energy consumption for mobile phones and other types of nodes is reduced. At the same time, the possibilities to exploit performance-enhancing technologies for multi-antennas are available.

BRIEF DESCRIPTION OF THE DRAWINGS

The present invention will now be described more in detail with reference to the appended drawings, where.

DETAILED DESCRIPTION

Figure 1:
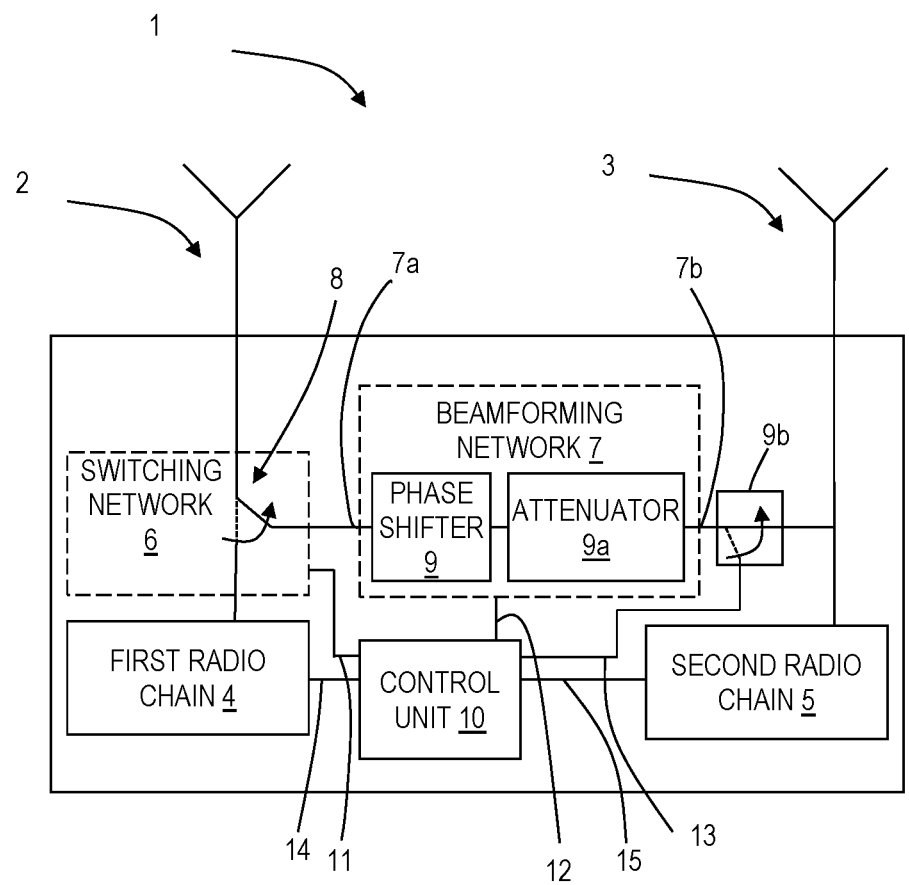
FIG. 1 schematically shows a first example of a node according to the present invention.

With reference to FIG. 1, showing a first example, there is a user terminal 1 in a wireless communication system, the user terminal 1 comprising a first antenna function 2, a second antenna function 3, a first radio chain 4 and a second radio chain 5.

According to the present invention, the user terminal 1 further comprises a switching network 6 and a beamforming network 7, where the switching network 6 comprises a first switch 8. The user terminal also comprises a second switch 9b. Each switch 8, 9b may each be in any of two states, a first state or a second state. The first state is indicated by a dashed line and the second state is indicated by a solid line.

The beamforming network 7 comprises a first connection 7a and a second connection 7b, where the first connection 7a is connected to the switching network 6 and the second connection 7b is connected to the second switch 9b.

In its first state, the first switch 8 connects the first antenna function 2 to the first radio chain 4, and in its second state, the first switch 8 connects the first antenna function 2 to the first connection 7a of the beamforming network 7.

In its first state, the second switch 9b disconnects the second connection 7b of the beamforming network 7 from both the second antenna 3 and the second radio chain 5, and in its second state, the second switch 9b connects the second connection 7b of the beamforming network 7 to both the second antenna 3 and the second radio chain 5.

At a first mode of operation, each switch 8, 9b is in its first state such that the first antenna function 2 is connected to the first radio chain 4 and disconnected from the beamforming network 7, and the second antenna function 3 is connected to second radio chain 5. The second connection 7b of the beamforming network 7 is disconnected from the second antenna 3 and the second radio chain 5.

At a second mode of operation, each switch 8, 9b is in its second state such that the first antenna function 2 is connected to the first connection 7a of the beamforming network 7 and disconnected from the first radio chain 4, and the second connection 7b of the beamforming network 7 is connected to the second antenna 3 and the second radio chain 5.

Thus, at the second mode of operation, the antenna functions 2, 3 are connected to the same radio chain 5, and by means of the beamforming network 7 the user terminal 1 is arranged to perform beamforming for the antenna functions 2, 3. The switching network 6 is arranged to switch between the first mode of operation and the second mode of operation.

In this example, the beamforming network 7 comprises a phase shifter 9, where a control unit 10 is arranged to control these via a first control connection 12. The control unit is further arranged to control the switching network 6 and the second switch 9b via a corresponding second control connection 11 and third control connection 13.

The control unit 10 is arranged to perform control in dependence of the channel, where the control unit 10 is connected to the first radio chain 4 and the second radio chain 5 via a corresponding fourth control connection 14 and fifth control connection 15.

According to one control alternative, the user terminal 1 is in the first mode of operation and transmits, or receives, reference signals via both antenna functions 2, 3 separately. Based on channel and rank estimation, or feedback, the control unit 10 can decide to switch off the first radio chain 4, and connect both antenna functions 2, 3 to the second radio chain 5 in accordance with the second mode of operation.

In this alternative, the second mode of operation comprises:
connecting the antenna functions 2, 3 to the second radio chain 5, and
connecting the antenna functions 2, 3 to the first radio chain 4 and the second radio chain 5, respectively, transmitting or receiving reference signals via both antenna functions 2, 3 separately in short time bursts.

The second mode of operation thus comprises switching back to the first mode of operation for relatively short time periods in order to transmit or receive reference signals via both antenna functions 2, 3 separately in short time bursts.

Based on these reference signals, the control unit 10 can choose to switch back to the first mode of operation.

According to another control alternative, the user has no need of high data rates. Then the control unit 10 can choose to switch to the second mode of operation until higher data rates are required.

According to yet another control alternative, a user wants to have low power consumption in the user terminal 1 and therefore manually decides to always use the second mode of operation.

Figure 2:
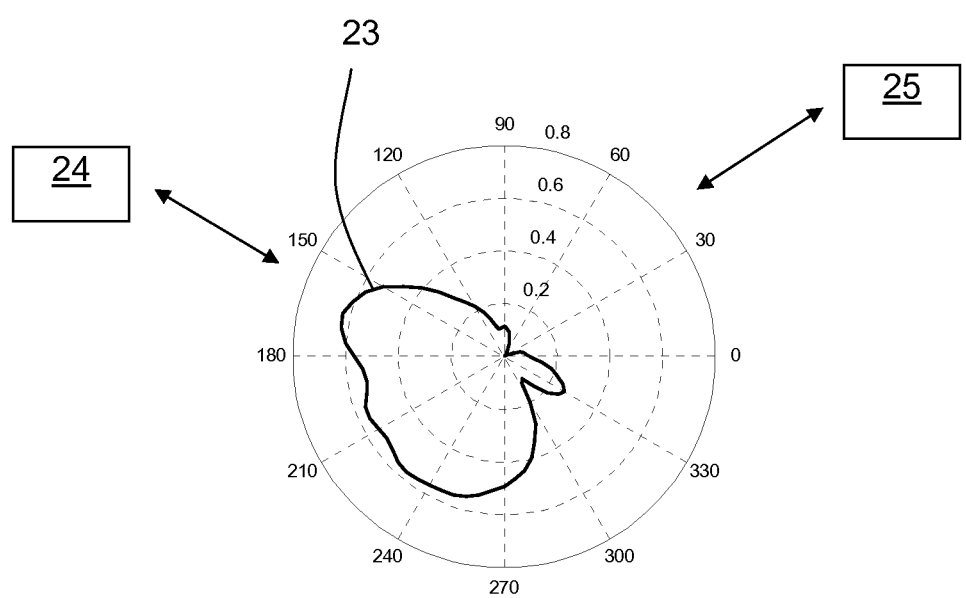
FIG. 2 shows a polar antenna radiation diagram showing the function of the present invention.

FIG. 2 exemplifies how the beamforming network can be used when the user terminal is working according to the second mode of operation, which means that both antenna functions 2, 3 are connected to the second radio chain 5. The user terminal, represented by its radiation pattern 23, is communicating with a first base station 24 and receives an interference signal from a second base station 25. The phase shifter 9 is used to steer the resulting radiation pattern 23 of the two antenna functions such that it faces the first base station 24 and faces away from the second base station 25, which will be discussed more in detail below.

In order to obtain the desired result, a number of phase settings of the phase shifter 9 are tested, which will result in different shapes of the radiation pattern 23. It is desirable to achieve a radiation pattern that has high gain towards the first base station 24, which the user terminal communicates with, and low gain towards the second base station 25 that interferes with the user terminal. The performance of the communication link between the first base station 24 and the user terminal is improved significantly.

An alternative way to find the phase setting is to use numerical optimization to maximize the SINR, e.g. a gradient search.

Other metrics such as rank indicator or CQI may be used to check the quality of the communication link.

The present invention can be implemented in any wireless device that has more than one antenna and more than one radio. For example, if there are four antenna functions and four radio chains, all four antenna functions could be connected to one radio chain while three radio chains are turned off and thus energy is saved. Another alternative is to connect two antenna functions to one radio chain and the two remaining antenna functions to another radio while two radio chains are turned off to save energy.

Figure 3:
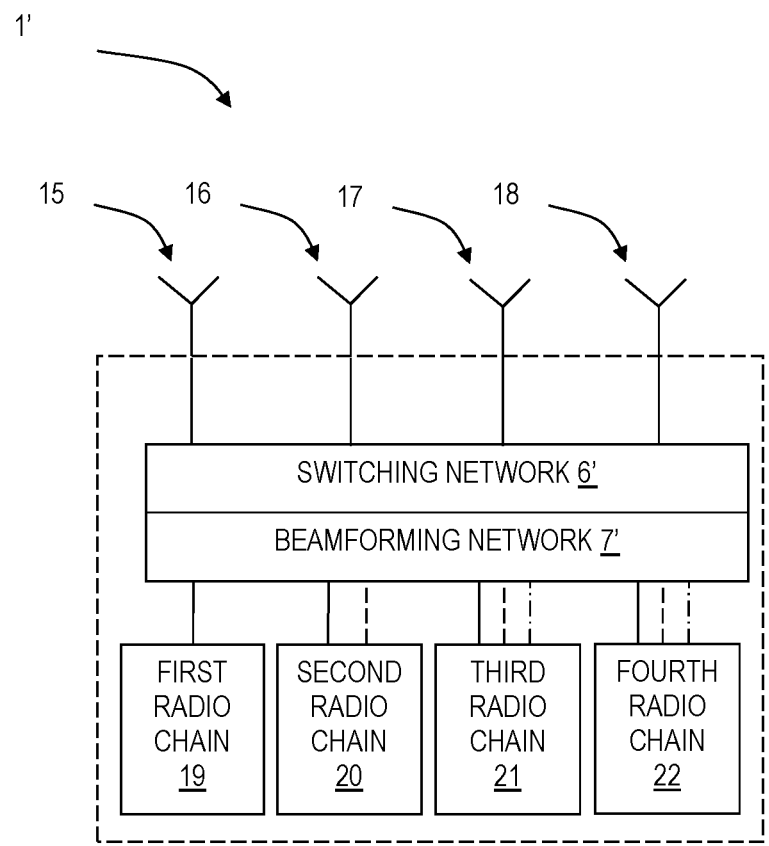
FIG. 3 schematically shows a second example of a node according to the present invention.

This will be described more with reference to FIG. 3 showing a second example of a more general character. Here, a node such as a user terminal 1' comprises a first antenna function 15, a second antenna function 16, a third antenna function 17 and a fourth antenna function 18. The node further comprises a switching network 6' and a beamforming network 7' and also a first radio chain 19, a second radio chain 20, a third radio chain 21 and a fourth radio chain 22. The node 1' also comprises a control unit as in the first example above, which is not shown for reasons of clarity. Here, the second switch of the first example should be understood to be implemented in the beamforming network 7', which of course will be constituted by three switches here.

Three different states are indicated, where the first state corresponds to the first mode of operation according to the first example above and the second state and third state correspond to the second mode of operation according to the first example above In a first state, as indicated with solid lines between the beamforming network 7' and the radio chains 19, 20, 21, 22, all the antenna functions 15, 16, 17, 18 are connected to all the radio chains 19, 20, 21, 22.

In a second state, as indicated with dashed lines between the beamforming network 7' and the radio chains 19, 20, 21, 22, the antenna functions 15, 16, 17, 18 are connected to the second radio chain 20, the third radio chain 21 and the fourth radio chain 22, the first radio chain 19 being disconnected and turned off.

In a third state, as indicated with dot-dashed lines between the beamforming network 7' and the radio chains 19, 20, 21, 22, the antenna functions 15, 16, 17, 18 are connected to the third radio chain 21 and the fourth radio chain 22, the first radio chain 19 and the second radio chain 20 being disconnected and turned off.

The control alternatives discussed above regarding control of the switching network are of course applicable for the second example, as well as for any configuration which uses the present invention.

Turning off a radio in a mobile phone 1 is equivalent to reducing the SINR on that antenna port in a MIMO (Multiple Input Multiple Output) system. Therefore, a mobile system utilizing MIMO communication regards this as if the number of possible streams is reduced and acts accordingly. Therefore, the proposed concept implemented in a user terminal 1 does not require any changes in the mobile system.

Figure 4:
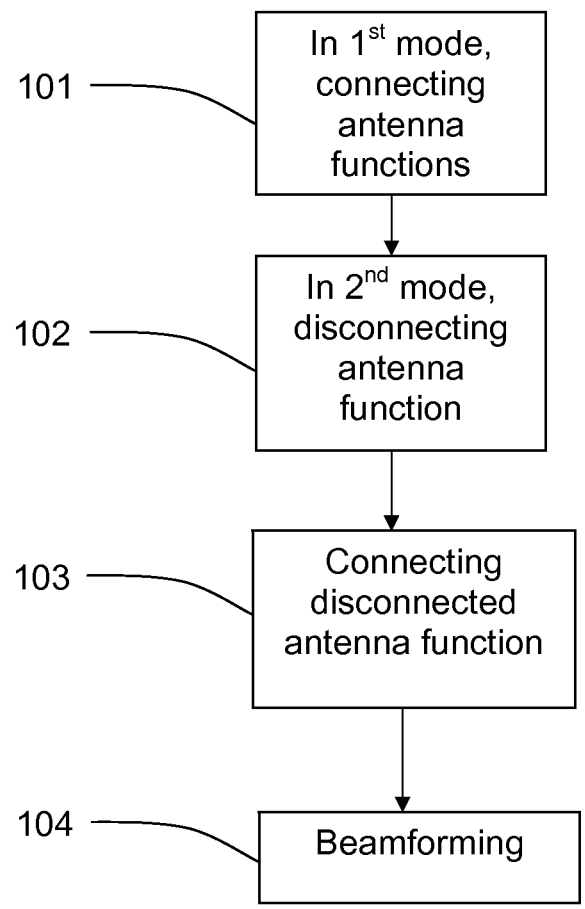
FIG. 4 shows a flow chart of a method according to the present invention.

With reference to FIG. 4, the present invention also refers to a method in a wireless communication system, the method comprising the steps:

101: at least at the start of a first mode of operation, connecting antenna functions to corresponding radio chains, each antenna function being connected to a corresponding radio chain,

102: at least at the start of a second mode of operation, disconnecting at least one antenna function from its corresponding radio chain;

103: connecting said at least one disconnected antenna function to another of said corresponding radio chains via at least a part of a beamforming network, such that at least two antenna functions, at least at the start of the second mode of operation, are connected to the same radio chain; and

104: using said beamforming network to perform beamforming for said at least two antenna functions.

The invention is not limited to the examples above, but may vary freely within the scope of the appended claims. For example, those radio chains from which an antenna function is disconnected, may, or may not, be turned off.

It should be noted that although certain switch states are apparent at a certain mode of operation, these should generally be regarded to be apparent at least at the start of a certain mode of operation.

Preferably, the first mode of operation corresponds to MIMO communication.

An extension to using just one phase shifter is to use two phase shifters and a hybrid combiner in a configuration as the "phase-to-power converter". In this way, both the phase and amplitude of the two antenna functions can be controlled by the means of two phase shifters.

The beamforming network 7, 7' may have any suitable form and may comprise any suitable components in dependence of the number of antenna functions and radio chains. For example, the beamforming network 7 is shown comprising an attenuator 9a.

The switching network 6 is described as only comprising one switch 8. Of course the number and configuration of switches in the switching network 6 may vary in dependence of the number of antenna functions and radio chains. The switches may be realized in any suitable technology, preferably semiconductor technology.

The examples above refer to a node or a user terminal, where a node is the most general term. A node may refer to any type of user terminal such as a mobile phone or a laptop. A node may also refer to any type of installation such as a base station or repeater station.

The second switch 9b is used for isolating the second antenna function 3 from the second connection 7b of the beamforming network 7. This isolation may not be necessary, and may also be accomplished in other suitable ways. The second switch or corresponding switches may, as indicated in the second example, be comprised in the beamforming network 7'.

The switching network 6 and the beamforming network 7, 7' may be comprised in one common unit.

The control alternatives discussed regarding how to control the switch states are only examples of how such a control may be performed. Many other types of control are of course conceivable.

The present invention relates to switching off one or more radios in a node, while maintaining the benefits of having access to all antennas. How the beamforming or combining of the antennas is performed is not within the scope of the present invention, although some examples regarding how to find the desired phase settings are provided in the description. These should of course only be regarded as examples. There should be at least two antenna functions and at least two radio chains in the node.

The antenna functions may have any suitable form depending on the present application. In a mobile phone, an antenna function may be constituted by a small meandered transmission line, and in a base station it may comprise an array antenna.

What is claimed is:

1. A method, performed by a controller, for configuring a switching network to couple antennas and radio chains for different modes of operation, comprising:
configuring the switching network to couple each antenna to a corresponding radio chain while decoupling the antennas from a beamforming network for a first mode of operation associated with multiple-input, multiple-output (MIMO) communications; and
configuring the switching network to couple at least two antennas to a single radio chain and the beamforming network for a second mode of operation associated with beamforming communications, wherein the switching network is arranged between the antennas and the beamforming network with the beamforming network being between the switching network and the corresponding radio chain.

2. The method of claim 1, wherein configuring the switching network for the first mode of operation includes sending, by the controller, to the switching network, an indication to couple a first antenna to a first radio chain and a second antenna to a second radio chain; and
wherein configuring the switching network for the second mode of operation includes sending, by the controller, to the switching network, an indication to couple the first antenna to the second radio chain so that the first and second antennas are coupled to the second radio chain to form the beamforming network used for the beamforming communications.

3. The method of claim 2, wherein configuring the switching network for the second mode of operation includes sending, by the controller, an indication to disable the first radio chain.

4. The method of claim 2, wherein configuring the switching network for the second mode of operation includes sending, by the controller, to the switching network, an indication to decouple the first antenna from the first radio chain.

5. The method of claim 2, wherein configuring the switching network for the first mode of operation includes sending, by the controller, an indication to enable the first radio chain.

6. The method of claim 1, wherein configuring the switching network for the second mode of operation is responsive to determining to configure the switching network for the second mode of operation based on at least one of a channel estimate and a channel rank estimate.

7. The method of claim 1, wherein configuring the switching network for the second mode of operation is responsive to determining to configure the switching network for the second mode of operation based on feedback from a base station.

8. The method of claim 2, further comprising:
during the second mode of operation of the switching network, sending, by the controller, to the switching network, an indication to couple the first antenna to the first radio chain so that the first radio chain is configured to receive a first reference signal using the first antenna and the second radio chain is configured to receive a second reference signal using the second antenna.

9. The method of claim 8, further comprising:
during the second mode of operation of the switching network and in response to at least one of the first radio chain receiving the first reference signal and the second radio chain receiving the second reference signal, sending, by the controller, to the switching network, an indication to re-couple the first antenna to the second radio chain for the beamforming communications.

10. The method of claim 8, further comprising:
during the second mode of operation of the switching network and in response to an expiration of a predetermined time period, sending, by the controller, to the switching network, an indication to re-couple the first antenna to the second radio chain for the beamforming communications.

11. The method of claim 1, further comprising:
during the second mode of operation, switching to the first mode of operation to transmit or receive reference signals.

12. The method of claim 1, wherein the beamforming network includes a phase shifter.

13. A system for configuring a switching network to couple antennas and radio chains for different modes of operation, comprising:
a controller operationally coupled to the switching network, wherein the controller is configured to:
configure the switching network to couple each antenna to a corresponding radio chain while decoupling the antennas from a beamforming network for a first mode of operation associated with multiple-input, multiple-output (MIMO) communications; and
configure the switching network to couple at least two antennas to a single radio chain and the beamforming network for a second mode of operation associated with beamforming communications, wherein the switching network is arranged between the antennas and the beamforming network with the beamforming network being between the switching network and the corresponding radio chain.

14. The system of claim 13, wherein configuring the switching network for the first mode of operation includes the controller being further configured to send, to the switching network, an indication to couple a first antenna to a first radio chain and a second antenna to a second radio chain; and
wherein configuring the switching network for the second mode of operation includes the controller being further configured to send, to the switching network, an indication to couple the first antenna to the second radio chain so that the first and second antennas are coupled to the second radio chain to form the beamforming network used for the beamforming communications.

15. The system of claim 14, wherein configuring the switching network for the second mode of operation includes the controller being further configured to send an indication to disable the first radio chain.

16. The system of claim 14, wherein configuring the switching network for the second mode of operation includes the controller being further configured to send, to the switching network, an indication to decouple the first antenna from the first radio chain.

17. The system of claim 14, wherein configuring the switching network for the first mode of operation includes the controller being further configured to send an indication to enable the first radio chain.

18. The system of claim 13, wherein configuring the switching network for the second mode of operation is responsive to the controller being further configured to determine to configure the switching network for the second mode of operation based on at least one of a channel estimate and a channel rank estimate.

19. The system of claim 13, wherein configuring the switching network for the second mode of operation is responsive to the controller being further configured to determine to configure the switching network for the second mode of operation based on feedback from a base station.

20. The system of claim 14, wherein the controller is further configured to:
   during the second mode of operation of the switching network, send, to the switching network, an indication to couple the first antenna to the first radio chain so that the first radio chain is configured to receive a first reference signal using the first antenna and the second radio chain is configured to receive a second reference signal using the second antenna.

21. The system of claim 20, wherein the controller is further configured to:
   during the second mode of operation of the switching network and in response to at least one of the first radio chain receiving the first reference signal and the second radio chain receiving the second reference signal, send, to the switching network, an indication to re-couple the first antenna to the second radio chain for the beamforming communications.

22. The system of claim 20, wherein the controller is further configured to:
   during the second mode of operation of the switching network and in response to an expiration of a predetermined time period, send, to the switching network, an indication to re-couple the first antenna to the second radio chain for the beamforming communications.

23. The system of claim 13, further comprising:
   during the second mode of operation, switching to the first mode of operation to transmit or receive reference signals.

* * * * *